US008588027B2

(12) United States Patent
Liu et al.

(10) Patent No.: US 8,588,027 B2
(45) Date of Patent: Nov. 19, 2013

(54) VIBROSEIS ACQUISITION TECHNIQUE AND SYSTEM USING DYNAMIC SOURCE CONTROL

(75) Inventors: Qinglin Liu, Oslo (NO); Kevin O'Connell, Asker (NO)

(73) Assignee: WesternGeco L.L.C., Houston, TX (US)

( * ) Notice: Subject to any disclaimer, the term of this patent is extended or adjusted under 35 U.S.C. 154(b) by 484 days.

(21) Appl. No.: 12/834,286

(22) Filed: Jul. 12, 2010

(65) Prior Publication Data

US 2012/0008462 A1    Jan. 12, 2012

(51) Int. Cl.
*G01V 1/04* (2006.01)
*G01V 1/24* (2006.01)

(52) U.S. Cl.
USPC .......................... 367/56; 181/111

(58) Field of Classification Search
USPC ..................... 367/41, 56; 181/111
See application file for complete search history.

(56) References Cited

U.S. PATENT DOCUMENTS

| 7,492,665 | B2 | 2/2009 | Robertsson et al. | |
| 7,672,194 | B2 | 3/2010 | Jeffryes | |
| 2010/0020640 | A1 | 1/2010 | Eick et al. | |
| 2010/0085836 | A1 | 4/2010 | Bagaini et al. | |
| 2010/0142320 | A1* | 6/2010 | Bagaini | 367/49 |
| 2011/0305105 | A1 | 12/2011 | Dean | |
| 2012/0113747 | A1* | 5/2012 | Ferber | 367/21 |

OTHER PUBLICATIONS

Ras et al, "Harmonic Distortion in Slip Sweep Records" SEG Expanded Abstracts, 1999, vol. 18.*
Sercel, 428XL User's Manual vol. 1, Oct. 14, 2009, front page of Manual and p. 256.
Jack Bouska et al., "Distance Separated Simultaneous Sweeping: Efficient 3D Vibroseis in Oman", SEG Houston 2009 International Exposition and Annual Meeting.
Robert Sambell et al., "Land seismic super-crew unlocks the Ara carbonate play of the Southern Oman Salt Basin with wide azimuth survey", first break vol. 28, Feb. 2010, pp. 61-68.
Jack Bouska, "D05 Distance Separated Simultaneous Sweeping: the world's fastest Vibroseis technique", Vibroseis Workshop 2008, Prague, Czech Republic Oct. 13-15, 2008, pp. 67-69.
Rozemond, "Slip-Sweep Acquisition," 66th Annual International SEG Meeting, Nov. 1996: pp. 64-67.
Howe et al., "B007: Independent Simultaneous Sweeping," Rome 2008 Leveraging Technology, 70th EAGE Conference & Exhibition, 2008: pp. 1-5.
International Search Report and Written Opinion of PCT Application No. PCT/US2011/041608 dated Mar. 2, 2012.

* cited by examiner

*Primary Examiner* — Ian J Lobo

(57) ABSTRACT

A technique includes during a seismic acquisition, selectively forming groups of at least one seismic source from a plurality of seismic sources as the seismic sources become available based at least in part on a minimum source spacing distance. The technique also includes selectively activating the groups. Each group responds to being activated by substantially simultaneously initiating a sweep for the seismic source(s) of the group. The technique further includes regulating a timing of the group activations based at least in part on a slip time and a minimum group spacing distance.

19 Claims, 4 Drawing Sheets

VIBROSEIS ACQUISITION TECHNIQUE AND SYSTEM USING DYNAMIC SOURCE CONTROL

BACKGROUND

The invention generally relates to a vibroseis acquisition technique and system using dynamic source control.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones) and others are sensitive to particle motion (e.g., geophones, three component sensors, microelectromechanical system (MEMS) sensors, etc.). Industrial surveys may deploy only one type of sensors or several in different combinations. In response to the detected seismic events, the sensors generate optical or electrical signals to produce seismic data. Analysis of the seismic data can then indicate the presence or absence of probable locations of hydrocarbon deposits.

One type of seismic source is an impulsive energy source, such as dynamite for land surveys or a marine air gun for marine surveys. The impulsive energy source produces a relatively large amount of energy that is injected into the earth in a relatively short period of time. Accordingly, the resulting data generally has a relatively high signal-to-noise ratio, which facilitates subsequent data processing operations. The use of an impulsive energy source for land surveys may pose certain safety and environmental concerns.

Another type of seismic source is a seismic vibrator, which is used in connection with a "vibroseis" survey. For a seismic survey that is conducted on land, the seismic vibrator imparts a seismic source signal into the earth, which has a relatively lower energy level than the signal that is generated by an impulsive energy source. However, the energy that is produced by the seismic vibrator's signal lasts for a relatively longer period of time.

SUMMARY

In an embodiment of the invention, a technique includes during a seismic acquisition, selectively forming groups of at least one seismic source from a plurality of seismic sources as the seismic sources become available based at least in part on a minimum source spacing distance. The technique also includes selectively activating the groups. Each group responds to being activated by substantially simultaneously initiating a sweep for the seismic source(s) of the group. The technique further includes regulating a timing of the group activations based at least in part on a slip time and a minimum group spacing distance.

Advantages and other features of the invention will become apparent from the following drawing, description and claims.

DETAILED DESCRIPTION

Figure 1:
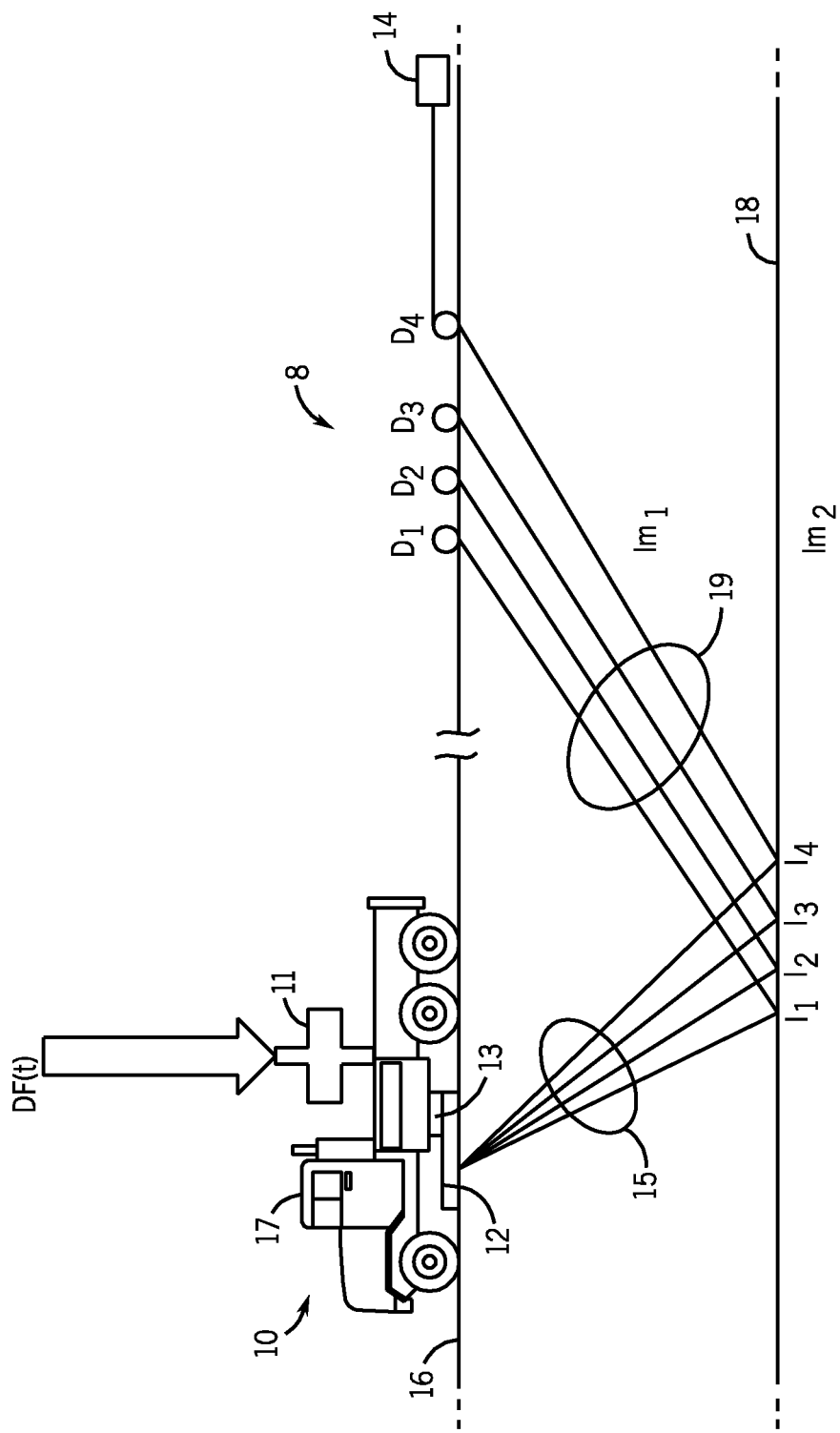
FIG. 1 is a schematic diagram of a vibroseis seismic acquisition system according to an embodiment of the invention.

Referring to FIG. 1, an exemplary land-based vibroseis acquisition system 8 in accordance with embodiments of the invention includes multiples seismic vibrators 10 (one of which is depicted in FIG. 1); surface-located geophones $D_1$, $D_2$, $D_3$ and $D_4$; and a data acquisition system 14. As part of operations associated with a vibroseis survey, the seismic vibrator 10 generates at least one vibroseis seismic sweep. More specifically, FIG. 1 depicts a subsurface sweep signal 15 that is generated by the vibrator 10 during the survey for purposes of injecting a vibroseis sweep into the earth. An interface 18 between subsurface impedances $Im_1$ and $Im_2$ reflects the signal 15 at points $I_1$, $I_2$, $I_3$ and $I_4$ to produce a reflected signal 19 that is detected by the geophones $D_1$, $D_2$, $D_3$ and $D_4$, respectively. The geophones $D_1$, $D_2$, $D_3$ and $D_4$ acquire measurements of sweeps that are generated by other seismic vibrators 10, as described further below. The data acquisition system 14 gathers the raw seismic data acquired by the geophones $D_1$, $D_2$, $D_3$ and $D_4$, and the raw seismic data may be processed to yield information about subsurface reflectors and the physical properties of subsurface formations.

Although the vibroseis acquisition system 8 is depicted in FIG. 1 as having geophones, as can be appreciated by the skilled artisan, the system 8 as well as the other seismic acquisition systems disclosed herein may employ a variety of different seismic sensors other than or in addition to the geophones, such as accelerometers, hydrophones and three component sensors, as just a few non-limiting examples.

For purposes of generating the signal 15, the seismic vibrator 10 may contain an actuator (a hydraulic or electromagnetic actuator, as examples) that drives a vibrating element 11 in response to a sweep pilot signal (called "DF(t)" in FIG. 1). More specifically, the DF(t) signal may be a sinusoid whose amplitude and frequency are changed during the generation of the sweep. Because the vibrating element 11 is coupled to a base plate 12 that is in contact with the earth surface 16, the energy from the element 11 is coupled to the earth to produce the signal 15.

Among its other features, the seismic vibrator 10 may include a signal measuring apparatus 13, which includes sensors (accelerometers, for example) to measure the signal 15 (i.e., to measure the output ground force of the seismic vibrator 10). As depicted in FIG. 1, the seismic vibrator 10 is mounted on a truck 17.

The vibrating element 11 contains a reaction mass that oscillates at a frequency and amplitude that is controlled by the DF(t) pilot signal: the frequency of the DF(t) signal sets the frequency of oscillation of the reaction mass; and the amplitude of the oscillation, in general, is controlled by a magnitude of the DF(t) signal. During the generation of the sweep, the frequency of the DF(t) signal transitions (and thus, the oscillation frequency of the reaction mass transitions) over a range of frequencies, one frequency at time. The amplitude of the DF(t) signal may be linearly or non-linearly varied during the generation of the sweep pursuant to a designed amplitude-time envelope.

Due to the mechanics and movement of the seismic vibrator, the overall time consumed in generating a vibroseis sweep significantly exceeds the sweep length, or duration, which is just one component of the overall time. For example, the overall time involved in generating a particular vibroseis sweep includes a time associated with deploying the base plate (such as the base plate 12 depicted in FIG. 1); the time to raise the base plate; and a time to move the seismic vibrator from the previous location to the location in which the sweep is to be injected. Therefore, for purposes of increasing acquisition efficiency, a seismic acquisition system may include multiple seismic vibrators that generate multiple sweeps in a more time efficient manner, as compared to generating the sweeps with a single seismic vibrator.

In accordance with embodiments of the invention disclosed herein, sweeps that are generated by the seismic vibrators may be any of a number of different types of sweeps, which are tailored for the particular acquisition. Thus, the techniques and system that are disclosed herein are not limited to any particular type of sweep and may use a variety of different sweep profiles, frequency bands, sweep energies, etc.

Care is exercised to ensure that the multiple seismic vibrators are operated in a manner that permits separation of the corresponding sensed seismic signals according to the sweep that produced the signal (i.e., for purposes of source separation). One technique to enhance source separation involves using multiple seismic vibrators to generate a succession of vibroseis sweeps and imposing a "listening time" interval between successive sweeps (i.e., an interval between the end of a particular sweep and the beginning of the next consecutive sweep). With this approach, the measurements produced by a given sweep are recorded during the listening time before the next sweep begins.

For purposes of further increasing the acquisition efficiency when multiple seismic vibrators are used, a "slip sweep" technique may be used, as described in, for example, Rozemond, H. J., 1996, *Slip-sweep acquisition, 66th* Annual International Meeting, SEG, Expanded Abstracts, 64-67. In the slip sweep technique, a particular sweep begins without waiting for the previous sweep to terminate. In the absence of harmonic noise, if the time interval between the beginning, or firing, of consecutive sweep sequences (called the "slip time") is greater than the listening time, then the seismic responses to the consecutive sweep sequences do not overlap in the time-frequency domain, which facilitates separation of the measurements.

Figure 2:
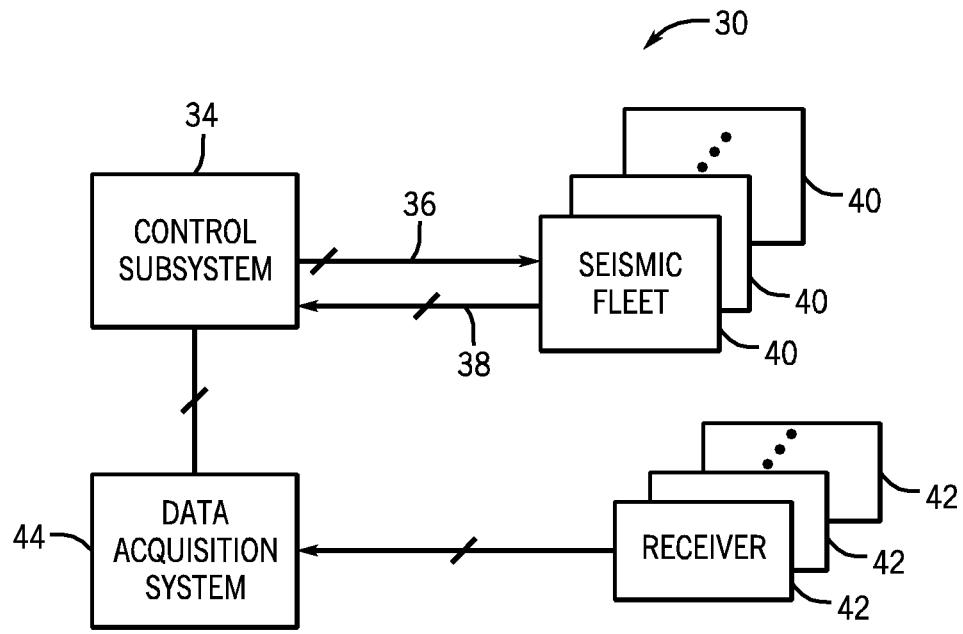
FIG. 2 is an illustration of a seismic acquisition system according to an embodiment of the invention.

Referring to FIG. 2, in accordance with embodiments described herein, a land-based seismic acquisition system 30 further enhances the efficiency of a vibroseis acquisition by dynamically grouping seismic sources, or fleets 40 (one or more seismic vibrators per fleet, for example), which are used in the acquisition into sweep groups as the fleets 40 become available. The fleets 40 of each sweep group operate in unison such that the activation of the sweep group causes all of the fleets 40 of the group to simultaneously initiate a set of sweeps. In the context of this application, the activation of a particular sweep group means that a command has been sent to the group to initiate its sweep set, and the group responds to this command by initiating its sweep set.

The efficiency of the seismic survey is further enhanced by activating the sweep groups pursuant to a slip time sequence. In other words, the activation of each sweep group occurs at approximately a slip time (called "T1" herein) after the prior sweep group in the sequence initiates its sweep set. Thus, the sweep sets overlap each other in time, as governed by the slip sweep timing. As described below, a minimum source spacing distance (called the "D1 distance" herein) controls which seismic fleets 40 are grouped together; and a minimum group spacing distance (called the "D2 distance" herein) controls which sweep fleets may be grouped for activation. As an example, the D1 distance may be a fixed distance that is a certain distance more than an exploration target depth. The D1 distance may be empirically determined and, in general, is a sufficient separation distance to maintain interference between seismic fleets of the same group below a predetermined threshold. The D2 distance is a distance that may also be empirically determined and, in general, is a sufficient separation distance to maintain interference between different seismic groups below another predetermined threshold. In the exemplary implementations disclosed herein, the D1 distance is greater than the D2 distance.

The seismic acquisition system 30 may include a control subsystem 34 that is in communication with the seismic fleets 40 for purposes of receiving data (via communication links 38) indicative of which seismic fleets 40 are available to generate sweeps and the relative or absolute positions of the seismic fleets 40. As further described below, based on the distances between the seismic fleets 40 and the knowledge of sweeps that are currently being generated, the control subsystem 34 selectively groups the seismic fleets 40 into the sweep groups and communicates (via communication links 36) with the seismic fleets 40 for purposes of selectively activating the sweep groups in a time sequence.

Among its other features, the seismic acquisition system 30 may also include receivers 42 (geophones, for example), which acquire seismic measurements in response to the sweeps that are generated by the seismic fleets 40. A data acquisition system 44 stores data indicative of the acquired seismic measurements. In other implementations, the seismic data acquisition system 30 may be an autonomous nodal system in which the data acquired by the receivers may be stored in the receivers 42 or otherwise stored in a device that locally connected to the receivers 42; and this locally stored data may thereafter be transported to the processing system.

In general, the control subsystem 34 applies the following distance separation and slip time rules for grouping the seismic fleets 40 and scheduling the sweep sets. First, the control subsystem 34 dynamically and selectively groups the seismic fleets 40 into the sweep groups based on the separation distances among the fleets 40. More specifically, any two or more of the seismic fleets 40 may be grouped together as a particular sweep group if the fleets 40 are spaced apart by at least the D1 distance. All of the seismic sources of a given sweep fleet or group may simultaneously begin their sweeps at substantially the same time to generate a given sweep set. In this context, "substantially beginning the sweeps at the same time" includes the case where the seismic sources of the group begin their sweeps at exactly the same time, the case where the seismic sources of the group unintentionally begin their sweeps at not exactly the same time (due to tolerances, for example) and the case where the seismic sources of the group begin their sweeps intentionally at slightly different times due to a technique such as source dithering.

The control subsystem 34 also includes a queuing mechanism that can prioritize which of the available sweep groups will become active. The queuing mechanism may be manually applied; or in other embodiments of the invention, the control subsystem 34 may queue requests to activate the fleets in a queue and prioritize the requests using simple or complex queuing algorithms, depending on the particular implementation. As a non-limiting example, in some embodiments of the invention, the queuing of the sweep groups may be controlled pursuant to a queuing algorithm similar to the one disclosed in U.S. patent application Ser. No. 12/796,714, entitled, "CONTROLLING SEISMIC SOURCES IN CONNECTION WITH A SEISMIC SURVEY," filed on Jun. 9, 2010, which is hereby incorporated by reference in its entirety.

The control subsystem 34 regulates the timing of when a particular sweep group is activated based on the T1 slip time. More specifically, in the course of the sequence, the control subsystem 34 initiates the sweep sets for a particular sweep group at a given time, and then, before the end of this sweep set (more specifically, at or slightly after the T1 slip time after the given time) the control subsystem 34 initiates the next sweep set. This pattern continues throughout the slip time sequence so that the activation times for the sweep groups (and thus, the initiation times for the sweep sets) are staggered by approximately the T1 slip time.

In order to be eligible to be the next activated sweep group, a given candidate sweep group must be separated from the group that is generating the currently ongoing sweep set by at least the D2 distance. In other words, all seismic fleets 40 of the candidate sweep group must be separated by at least the D2 distance from all of the seismic fleets 40 of the sweep group which is currently generating the ongoing sweep set. Thus, the control subsystem 34 applies the following rule: a given candidate sweep group may begin generation of its sweep set at the T1 slip time offset from the time at which the current ongoing sweep set began if the candidate sweep group is separated by a distance greater than the D2 distance from the sweep group that is generating the ongoing sweep set.

By controlling the selection of the seismic fleets 40 for sweep sequences using the queuing mechanism and the timing of the sweep sequences based on the D1 and D2 distances and T1 slip time, optimum survey production may be achieved. In some embodiments of the invention, the control subsystem 34 may dynamically determine one or both of the D1 and D2 distances based on seismic measurements according to some predefined parameter specifications. The control subsystem 34 may also dynamically determine the optimum T1 slip time as a function of the actual group separation distance, in accordance with some embodiments of the invention.

Figure 3:
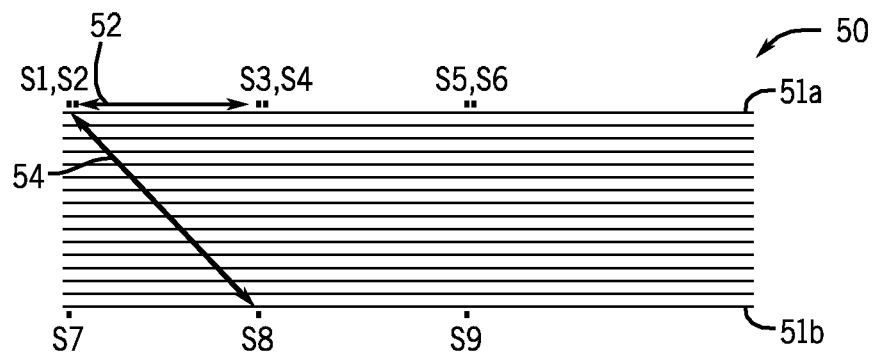
FIGS. 3, 4 and 5 are illustrations of exemplary seismic spreads according to embodiments of the invention.

As a more specific example, FIG. 3 depicts an exemplary spread 50 of seismic fleets (called the S1, S2, S3, S4, S5, S6, S7, S8 and S9 seismic fleets herein) according to embodiments of the invention. A fleet includes one or more sources (vibrators, for example). The seismic sources within a fleet are normally close together but can be spread far apart depending on the type of operation. For the spread 50, the S1, S2, S3, S4, S5 and S6 seismic fleets are disposed along a particular source line 51a; and the S7, S8 and S9 seismic fleets are disposed along another source line 51b. The S1 and S2 seismic fleets are located next to each other, and as such, cannot be part of a sweep group due to the D1 distance requirement. Furthermore, the S3 and S4 seismic fleets are disposed next to each other as well as the S5 and S6 seismic fleets. Furthermore, as illustrated in FIG. 3, the S1 and S2 seismic fleets are separated from the S3 and S4 seismic fleets by a distance 52, which is less than the D1 distance. As such, for this example, the S1 or S2 seismic fleet cannot be grouped with either the S3 or S4 seismic fleet. As also shown in FIG. 3, the S1 and S2 seismic fleets are disposed a distance 54 away from the S8 seismic fleet. The distance 54 is greater than the D2 distance but less than the D1 distance. The S1 or S2 seismic fleet is separated to each of the S5, S6 and S9 seismic fleets by a distance larger than D1, and either the S1 seismic fleet or the S2 seismic fleet may be grouped together with any one of S5, S6 and S9 seismic fleets in a sweep group.

For the following example, it is assumed that the T1 slip time and sweep time are six and twelve seconds, respectively. The S1 and S5 seismic fleets are separated apart by a distance greater than the D1 distance, and for this example are teamed up as a sweep group (called the "S1-S5 sweep group"). The S8 seismic fleet is disposed a distance greater than the D2 distance apart from both the S1 seismic fleet and the S5 seismic fleet. Therefore, the S8 seismic fleet may start six seconds (the T1 slip time) after the activation of the S1-S5 sweep group.

Continuing the example, the distance between the S7 and S9 seismic fleet is greater than the D1 distance, and both the S7 and S9 seismic fleets are separated more than the D2 distance apart from the S8 seismic fleet. Therefore, the S7 and S9 seismic fleet may be paired together as a sweep group and begin their sweeps simultaneously six seconds after the S8 seismic fleet begins its sweep.

As a more specific but non-limiting example, an exemplary slip time sequence for the spread 50 may be as follows (where "→" denotes a progression in time):

S1-S5→T1 slip time→S8→T1 slip time→S7-S9→T1 slip time→S3→T1 slip time→S2-S6→T1 slip time→S4→T1 slip time→S1-S5→T1 slip time→S8→T1 slip time→S7-S9→T1 slip time→S3→T1 slip time→S2-S6→T1 slip time→S4→T1 slip time→ . . . .

To maintain the efficiency and balance, the same number of seismic fleets on source line 51a may be deployed on each source line 51b. This alternative arrangement has some source redundancy for this example, but source redundancy will compensate for the non-uniform moving up time in complex areas.

Figure 4:
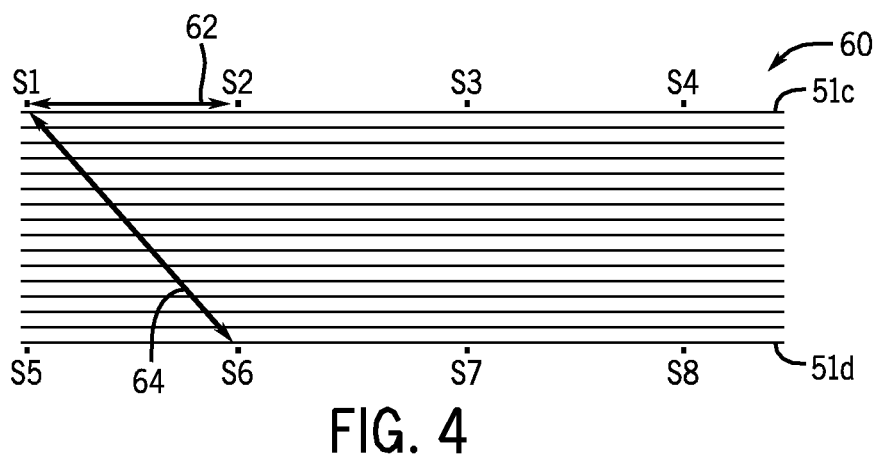

To maintain the efficiency and balance of the shooting speed, the same number of seismic fleets may be deployed on each source line 51c and 51d, as depicted by an exemplary spread 60 in FIG. 4. For the example depicted in FIG. 4, S1, S2, S3 and S4 seismic fleets are deployed on a particular seismic source line 51c and have spacings that correspond to the spacings between S5, S6, S7 and S8 seismic fleets, which are deployed on another seismic source line 51d. For this example, the S1 and S2 seismic fleets are separated by a distance 62 that is less than the D1 distance but larger than D2, and the S1 and S6 seismic fleets are separated by a distance 64, which is greater than the D2 distance but less than D1.

As a non-limiting example, for the spread 60, the slip time sequence may be as follows. If the distance separation between the S1 seismic source to any of S3, S4, S7 and S8 seismic fleets is greater than the D1 distance, then the S1 seismic fleet may be grouped together with any of the S3, S4, S7 and S8 seismic fleets, which is ready. As a non-limiting example, the S1 seismic fleet may be grouped together with the S3 seismic fleet in a particular sweep group.

As examples, the following shooting sequence may be used:

S1-S3→T1 slip time→S2-S4→T1 slip time→S5-S7→T1 slip time→S6-S8 . . . .

or an alternative shooting sequence may be used:

S1-S3→T1 slip time→S5-S7→T1 slip time→S2-S4→T1 slip time→S6-S8 . . . .

Figure 5:
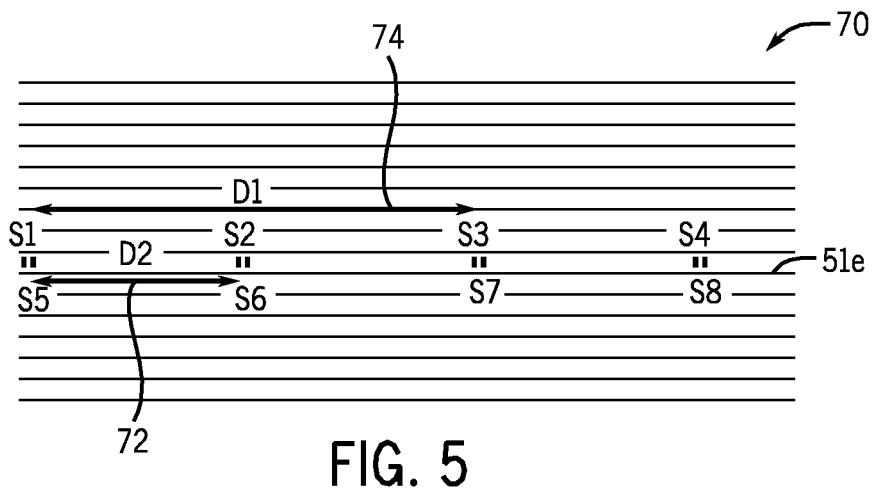

FIG. 5 illustrates another exemplary spread 70 for S1, S2, S3, S4, S5, S6, S7 and S8 seismic fleets, which are all disposed on the same seismic source line 51e. Furthermore, for this example, the S1 and S5 seismic fleets are close to each other, the S2 and S6 seismic fleets are close to each other, the S3 and S7 seismic fleets are close to each other, and the S4 and S8 seismic fleets are close to each other. Moreover, as illustrated in FIG. 5, the S1 and S5 seismic fleets are separated from the S2 and S6 seismic fleets by a distance 72 that is the same or slightly greater than the D2 distance; and the S1 and S5 seismic fleets are separated from the S3 and S7 seismic fleets by a distance 74 that is the same or slightly greater than the D1 distance. For this spread 70, an exemplary shooting sequence may be as follows:

S1-S3→T1 slip time→S6-S8→T1 slip time→S5-S7→T1 slip time→S2-S4 . . . .

For general cases, the T1 slip time may be a function of the distance separation between the sweep groups and may be optimized through the use of optimization algorithms based on an objective function to obtain minimum interferences. Thus, in accordance with some embodiments of the invention, the control subsystem 34 may assign sweep groups and then determine whether any group is a candidate for activation for a slip time sweep. If so, the control subsystem 34 determines the optimal slip sweep time and assigns the next sweep group in the slip time sequence.

Figure 6:
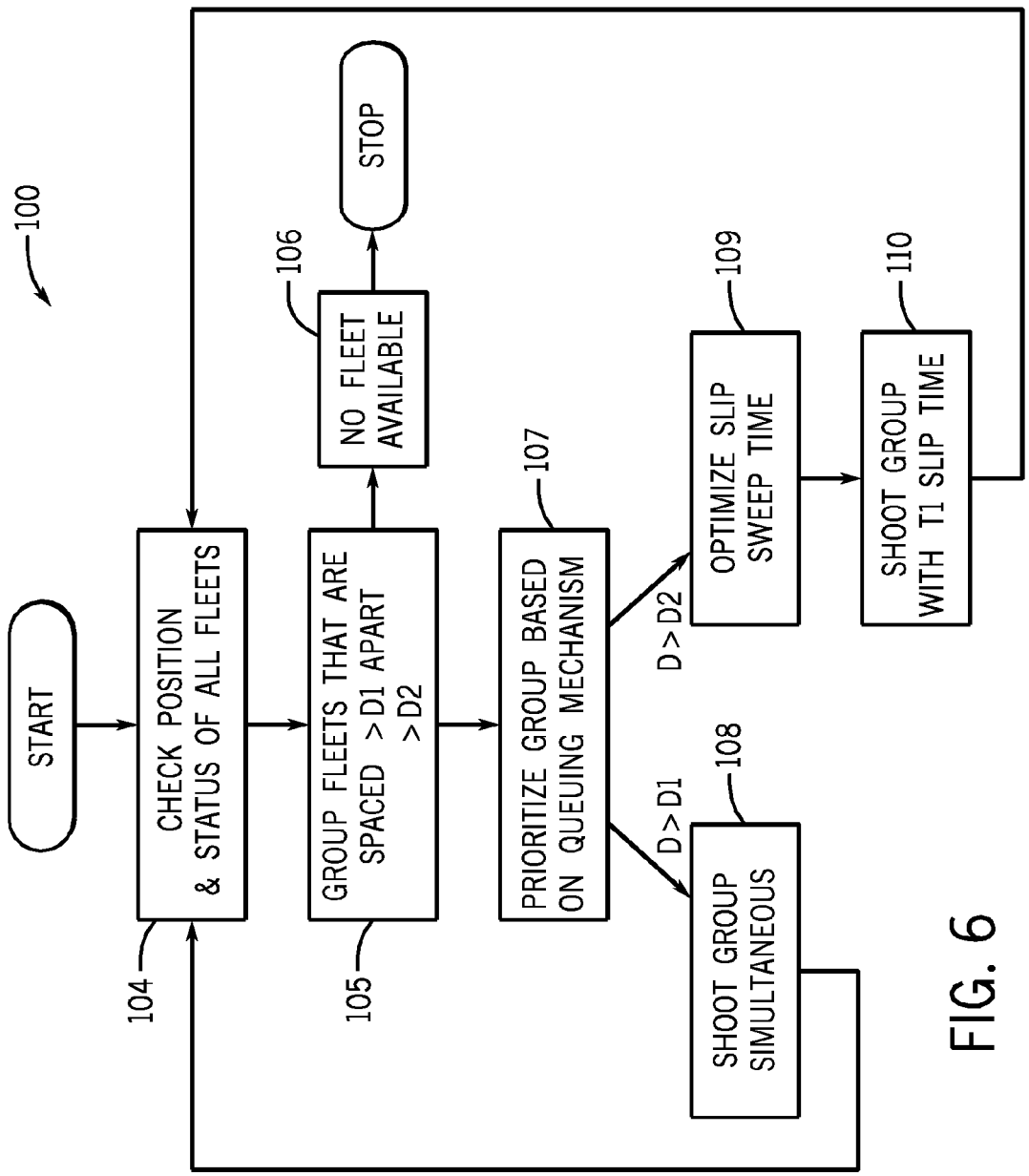
FIG. 6 is a flow diagram depicting a technique to control the grouping of seismic fleets and the timing of sweeps generated by the seismic fleets according to embodiments of the invention.

To summarize, FIG. 6 depicts an exemplary technique 100 that may be performed by the control subsystem 34 (see FIG. 2) in accordance with embodiments of the invention. Pursuant to the technique 100, the control subsystem 34 checks which source fleets are available, their status (moving, sweeping, ready) and their positions (block 104), and then the control subsystem 34 determines which source fleets can be grouped using the various distance rules and time rules (block 105). If no fleet is available (block 106), the technique 100 terminates. The control subsystem 34 prioritizes (block 107) which group should be activated based on a simple or complex automatic queuing system, depending on the implementation. The control subsystem 34 then activates the sweep groups according to the T1 slip time, D1 distance and D2 distance. In this manner, for fleets that are part of the same group spaced apart by more than the D1 distance, the control subsystem 34 shoots (block 108) these fleets simultaneously; and for groups spaced apart by at least the D2 distance, the subsystem 34 optimizes (block 109) the T1 slip time and shoots (block 110) the group accordingly.

Many other variations are contemplated and are within the scope of the appended claims. For example, a single fleet may be ready close by that can shoot after the T1 slip time if no other fleets are available.

It is noted that the D1 and D2 distances as well as the T1 slip time may be dynamically defined in the field by the control subsystem 34 according to predefined parameter specifications. Furthermore, the grouping and sequencing may be performed dynamically using the above-described rules.

Figure 7:
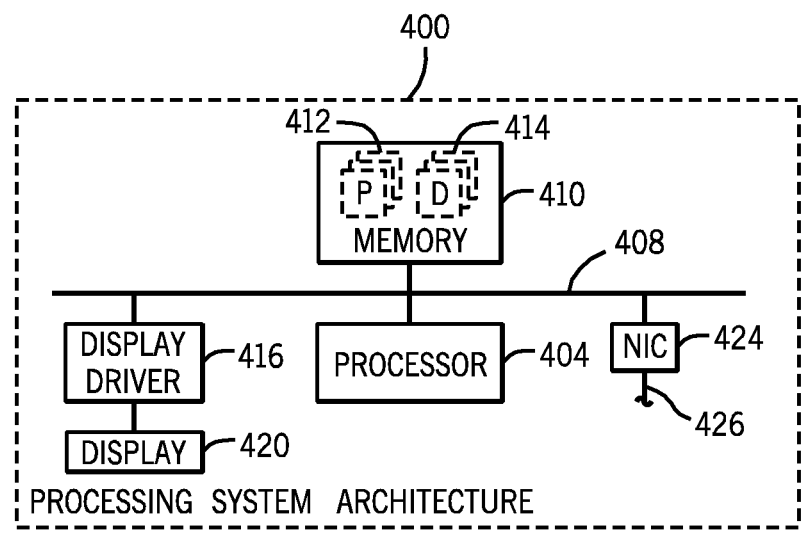
FIG. 7 is a schematic diagram of an exemplary control system architecture according to an embodiment of the invention.

Referring to FIG. 7, in accordance with some embodiments of the invention, the control subsystem 34 (FIG. 2) may have a processing system architecture 400. In general, the architecture 400 may include at least one processor 404, such as a microcontroller, microprocessor, a microprocessor processing core, etc. In general, the processor 404 may be coupled through one or more buses 408 to a memory 410, which stores various programs 412 and datasets 414. At least one of the programs 412, when executed by the processor 404, causes the processor 404 to form the sweep groups from available seismic sources, select groups for slip sweeps and activate the sweep groups according to the techniques that are disclosed herein, such as the technique 100 (FIG. 6). In general, the processor 404 may perform all or part of the techniques 100 and/or 150, depending on the particular embodiment of the invention. Initial, intermediate, or final processing results may be stored in datasets 414 in the memory 410.

It is noted that FIG. 7 merely depicts one out of many possible processing system architectures. Thus, many variations are contemplated and are within the scope of the appended claims. For example, in accordance with other embodiments of the invention, the processing system architecture 400 may be a distributed processing system architecture and thus, may include processing subsystems that are connected together and may be located at different locations.

For the processing system architecture 400 that is depicted in FIG. 7, the architecture 400 may include a display driver 416 that drives a display 420 for purposes of displaying the results of the processing by the processor 404. As examples, the display 420 may display positions of the seismic sources, determine optimal slip times, display graphical data indicative of the grouping of the seismic sources, display distances between the seismic sources and between seismic source groups, display an indicator of the slip time sequence, etc.

Additionally, as depicted in FIG. 7, the processing system architecture 400 may include interfaces to communicate with other computer and/or processing systems, such as a network interface card (NIC) 424, which is connected to a network 426, for example.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   during a seismic acquisition, selectively forming groups from a plurality of seismic sources as the seismic sources become available based at least in part on a minimum source spacing distance, each of the groups comprising at least two of the seismic sources;
   selectively activating the groups, wherein each group responds to being activated by substantially simultaneously initiating a sweep for each seismic source of the group; and
   regulating a timing of the group activations based at least in part on a slip time and a minimum group spacing distance, wherein the act of regulating the timing comprises:
      arranging the groups according to a sequence, wherein the groups are activated to initiate their respective sweeps at different times in the sequence; and
      selecting the placement of the groups in the sequence such that groups that are adjacent in time in the sequence are separated by at least the minimum group spacing distance.

2. The method of claim 1, wherein the minimum source spacing distance is greater than an exploration target depth.

3. The method of claim 1, further comprising selecting the minimum source spacing distance to maintain interference between the at least one seismic source of each group below a predetermined threshold.

4. The method of claim 1, further comprising selecting the minimum group spacing to maintain interference between the groups below a predetermined threshold.

5. The method of claim 1, wherein the minimum group spacing distance comprises a distance predicted to maintain interference between adjacent groups in the sequence below a predetermined threshold.

6. The method of claim 1, wherein the act of regulating comprises updating the slip time during the seismic acquisition based on a distance between adjacent groups in the sequence.

7. The method of claim 1, wherein the sweeps comprise vibroseis sweeps.

8. The method of claim 1, further comprising:
collecting requests to activate the groups in a queue; and
prioritizing the requests.

9. An article comprising a computer readable storage medium to store instructions that when executed by a computer cause the computer to:
during a seismic acquisition, selectively form groups from a plurality of seismic sources as the seismic sources become available based at least in part on a minimum source spacing distance;
selectively activate the groups, wherein each group responds to being activated by substantially simultaneously initiating a sweep for each seismic source of the group; and
regulate a timing of the group activations based at least in part on a slip time and a minimum group spacing distance, each of the groups comprising at least two of the seismic sources;
arrange the groups according to a sequence, wherein the groups are activated to initiate their respective sweeps at different times in the sequence; and
select the placement of the groups in the sequence such that groups that are adjacent in time in the sequence are separated by at least the minimum group spacing distance.

10. The article of claim 9, wherein the minimum group spacing distance comprises a distance predicted to maintain interference between adjacent groups in the sequence below a predetermined threshold.

11. The article of claim 9, the storage medium storing instructions that when executed by the computer cause the computer to update the slip time during the seismic acquisition based on distance between adjacent groups in the sequence.

12. The article of claim 9, wherein the sweeps comprise vibroseis sweeps.

13. A system comprising:
an interface to, during a seismic acquisition, receive first data indicative of which seismic sources of a plurality of seismic sources are available to initiate sweep sequences and second data indicative of positions of each of the plurality of seismic sources; and
a processor to process the first data and the second data to:
during the seismic acquisition, selectively form groups from the plurality of seismic sources as the seismic sources become available based at least in part on a minimum source spacing distance, each of the groups comprising at least two of the seismic sources;
selectively activate the groups, wherein each group responds to being activated by substantially simultaneously initiating a sweep for each seismic source of the group;
regulate a timing of the group activations based at least in part on a slip time and a minimum group spacing distance;
arrange the groups according to a sequence, wherein the groups are activated to initiate their respective sweeps at different times in the sequence; and
select the placement of the groups in the sequence such that groups that are adjacent in time in the sequence are separated by at least the minimum group spacing distance.

14. The system of claim 13, wherein the minimum source spacing distance is greater than the minimum group spacing distance.

15. The system of claim 13, wherein the sweeps comprise vibroseis sweeps.

16. The system of claim 13, wherein the processor is adapted to update the slip time during the seismic acquisition.

17. The system of claim 13, further comprising the seismic sources.

18. The system of claim 13, wherein the minimum source spacing distance is greater than a target exploration depth.

19. The system of claim 13, wherein the processor is adapted to:
collect requests to activate the groups in a queue; and
prioritize the requests.

* * * * *